United States Patent
Riedl

(10) Patent No.: US 7,395,993 B2
(45) Date of Patent: Jul. 8, 2008

(54) HEIGHT-ADJUSTABLE SUPPORT FOR SEMITRAILERS OR THE LIKE

(75) Inventor: Reinhold Riedl, Miltenberg (DE)

(73) Assignee: Georg Fischer Verkehrstechnik GmbH, Singen (DE)

( * ) Notice: Subject to any disclaimer, the term of this patent is extended or adjusted under 35 U.S.C. 154(b) by 130 days.

(21) Appl. No.: 11/290,931

(22) Filed: Nov. 29, 2005

(65) Prior Publication Data

US 2006/0119072 A1 Jun. 8, 2006

(30) Foreign Application Priority Data

Dec. 7, 2004 (DE) .................. 20 2004 018 874 U
Feb. 1, 2005 (DE) .................. 20 2005 002 082 U

(51) Int. Cl.
*B60S 9/04* (2006.01)

(52) U.S. Cl. .............. 248/188.8; 280/766.1; 280/763.1; 248/677; 248/188.2

(58) Field of Classification Search .............. 248/188.8, 248/677, 188.1, 354.1, 188.2, 188; 280/475, 280/763.1, 766.1
See application file for complete search history.

(56) References Cited

U.S. PATENT DOCUMENTS

| 3,751,067 | A | * | 8/1973 | Claflin et al. ............ 280/763.1 |
| 4,824,136 | A | * | 4/1989 | Baxter ......................... 280/475 |
| 4,903,977 | A | * | 2/1990 | Baxter ......................... 280/475 |
| 5,054,805 | A | * | 10/1991 | Hungerink et al. .......... 280/475 |
| 5,137,301 | A | * | 8/1992 | Muller et al. ............. 280/766.1 |
| 6,513,783 | B1 | * | 2/2003 | Alguera Gallego et al. . 248/677 |
| 6,802,535 | B1 | * | 10/2004 | Alguera Gallego et al. ........................ 280/763.1 |
| 7,128,340 | B1 | * | 10/2006 | Alguera Gallego et al. ........................ 280/763.1 |

FOREIGN PATENT DOCUMENTS

EP 0 886 592 12/1998
GB 2240527 A * 8/1991

* cited by examiner

*Primary Examiner*—Anita M King
(74) *Attorney, Agent, or Firm*—Bachman & LaPointe, P.C.

(57) ABSTRACT

A height-adjustable support for semitrailers wherein the foot plate is suspended on tension springs which are arranged in two parallel planes situated in each case between the track roller and the wall of the inner support tube, and is fastened to the foot plate by one eyelet in each case in the inner support tube and the other eyelet in the vicinity of the transverse axis, and in that the foot plate corresponds with the inner support tube by a retaining device which is not permanently in engagement.

17 Claims, 5 Drawing Sheets

HEIGHT-ADJUSTABLE SUPPORT FOR SEMITRAILERS OR THE LIKE

BACKGROUND OF THE INVENTION

The invention relates to a height-adjustable support for semitrailers.

Supports of this type, usually arranged in pairs, are arranged in the front region of the semitrailer. A respective supporting foot with a foot plate, on which at least one rolling element rolls, is situated at the lower end of the extendible inner support tubes. The supports are used whenever the semitrailer is parked separately from the articulated lorry. In the case of the semitrailers which are prevalent nowadays and have air-sprung axles, the axle region may drop during relatively long parked periods because of pressure losses in the air spring bellows. In this case, with the axle assembly generally braked during parking, the semitrailer is subjected to a longitudinal thrust forwards, which the foot plates of the support are incapable of following because of adherence to the ground. In this situation, the supports with rigid foot plates would be exposed to a high flexural and buckling stress which might result in them being damaged. In order to avoid this, the said rolling elements act in a thrust-compensating manner on the foot plates, i.e. the supports move forwards on the foot plate by the rolling elements rolling out of the central position. When the load on the supports is removed again during coupling-on of the semitrailer, spring elements ensure that the foot plates are returned again into the central position, i.e. symmetrically to the particular support axis.

A support of the generic type is known from EP 0 886 592 B1, with a rolling element being provided in the foot region, and wire cables and compression springs serving to fasten and reset the foot plate being proposed. A configuration of this type has a large number of parts. And, in this case, there is no further attachment means for the foot plate.

DE 40 03 414 C2, the supporting foot is of a what is referred to as a telescopic supporting device for semitrailers which a rolling segment as a cut-out opening of a hollow cylinder with a partially cylindrical convex surface as rolling surface, the convex surface having slots which extend in the circumferential direction and through which helical springs are passed, of which one is fastened at one end at the front of the foot plate and at the other end at the front of the support tube and the other is fastened at one end at the rear of the foot plate and at the other end at the rear of the support tube. In the direction of the end side, the helical springs are arranged such that they are exposed centrally with respect to the foot plate and are therefore permanently exposed without protection to the weather, which may result in corrosion damage and cause malfunctions. In this case the width of the rolling segment exceeds the width of the support and, due to the unfavourably great height of this supporting foot and the arrangement of its pivot axle, necessarily on the lowermost end region of the inner support tube, a semitrailer support provided in such a manner obtains a disadvantageous, large construction height. In addition, this supporting foot is pivotable only in one plane and cannot compensate in the transverse direction for any unevennesses of the ground, which may result in overstressing of the material in the case of uneven parking surfaces. In addition, after its suspension means are released, a foot of this type could be completely lost.

It is an object of the invention to provide a height-adjustable support of the type of construction referred to above, wherein the foot region of which, while retaining the smallest possible construction height with resetting elements arranged in a manner protected from the weather, has protected means of suspending the foot plate and causes less structural outlay.

SUMMARY OF THE INVENTION

The object is achieved in that the foot plate is suspended on tension springs which are arranged in two parallel planes situated in each case between the track roller and the wall of the inner support tube, and is fastened to the foot plate by one eyelet in each case in the inner support tube and the other eyelet in the vicinity of the transverse axis, and in that the foot plate corresponds with the inner support tube by means of a retaining device which is not permanently in engagement.

This solution has the advantage that the tension springs in the basic position of the support, i.e. both during transportation and when parked, in a resting supporting function, are situated entirely within the inner support tube in a manner protected against dirt and the weather and are only partially exposed only during a thrust compensation of the support. In an advantageous manner, the retaining device between the foot plate and the inner support tube is designed in such a manner that it is generally not in engagement. The foot plate is therefore pivotable to a sufficient extent both about its transverse axis and about its longitudinal axis. This pivotability on all sides with the possibility (which advantageously exists as a result) of adapting the foot plate to sloping ground is also ensured by the installation of a track roller, with a preferably cross-sectionally circular-arc-shaped concave track groove, into the inner support tube and a rolling track, of complementarily convex design with respect to the track groove of the track roller, on the foot plate. In contrast to a bar which conventionally penetrates a rolling segment and the side walls of the foot element and therefore, by means of tilting, prevents the foot element and the like from being adapted to the ground, in the case of the retaining device proposed there is absolutely no contact with other parts even when the foot plate is sufficiently pivoted transversely. The retaining device only comes into action if the tension springs should accidentally break at the same time, and it then brings about a secure interlocking of the foot plate with the inner support tube, so that the foot plate cannot be lost.

It is advantageous if centre-symmetrical stops are arranged on the inner support tube as lower extensions in pairs, the said stops having stop surfaces which are indented in each case in relation to the left and the right outer surfaces of the inner support tube and strike against stoppers situated on the foot plate upon maximum thrust compensation. Owing to the indented stop surfaces, the length of the foot plate can namely be kept short in a favourable manner.

If a fastening/locking attachment is provided which, sitting on the axle of the track roller in the inner support tube, serves both for fastening the springs and for axially fixing the axle, a preassembly of the subassembly of the foot region of the support is possible in a favourable manner. In addition, the outlay on a separate means of securing the axle against drifting out is also omitted.

Finally, it is advantageous to provide deflecting runners in the inner support tube, which deflecting runners gently deflect the tension springs, which are extended during the thrust compensation of the support. Also in an advantageous manner the deflection angles which arise in the process result in favourable spring force components during the resetting of the foot plate by the tension springs. It is particularly cost-effective to produce, i.e. to impress, the deflecting runners by means of a corresponding impressing of the shape in those wall portions of the inner support tube which are situated in the regions of the tension springs.

BRIEF DESCRIPTION OF THE DRAWINGS

The invention and its developments are described with reference to drawings of preferred exemplary embodiments. In the drawings.

DETAILED DESCRIPTION

The supports 10 which are arranged in pairs on the front lower side and symmetrically to the longitudinal axis of the semitrailer (not shown here) each have a vertical outer support tube 11, which is connected to the semitrailer frame, and an inner support tube 12, which is arranged displaceably in said outer support tube, the cross sections of which tubes are generally square. The support tube 12 can be mechanically extended and retracted, i.e. can be brought from the transporting position into the working position by extension or from the working position into the transporting position by retraction.

Figure 1:
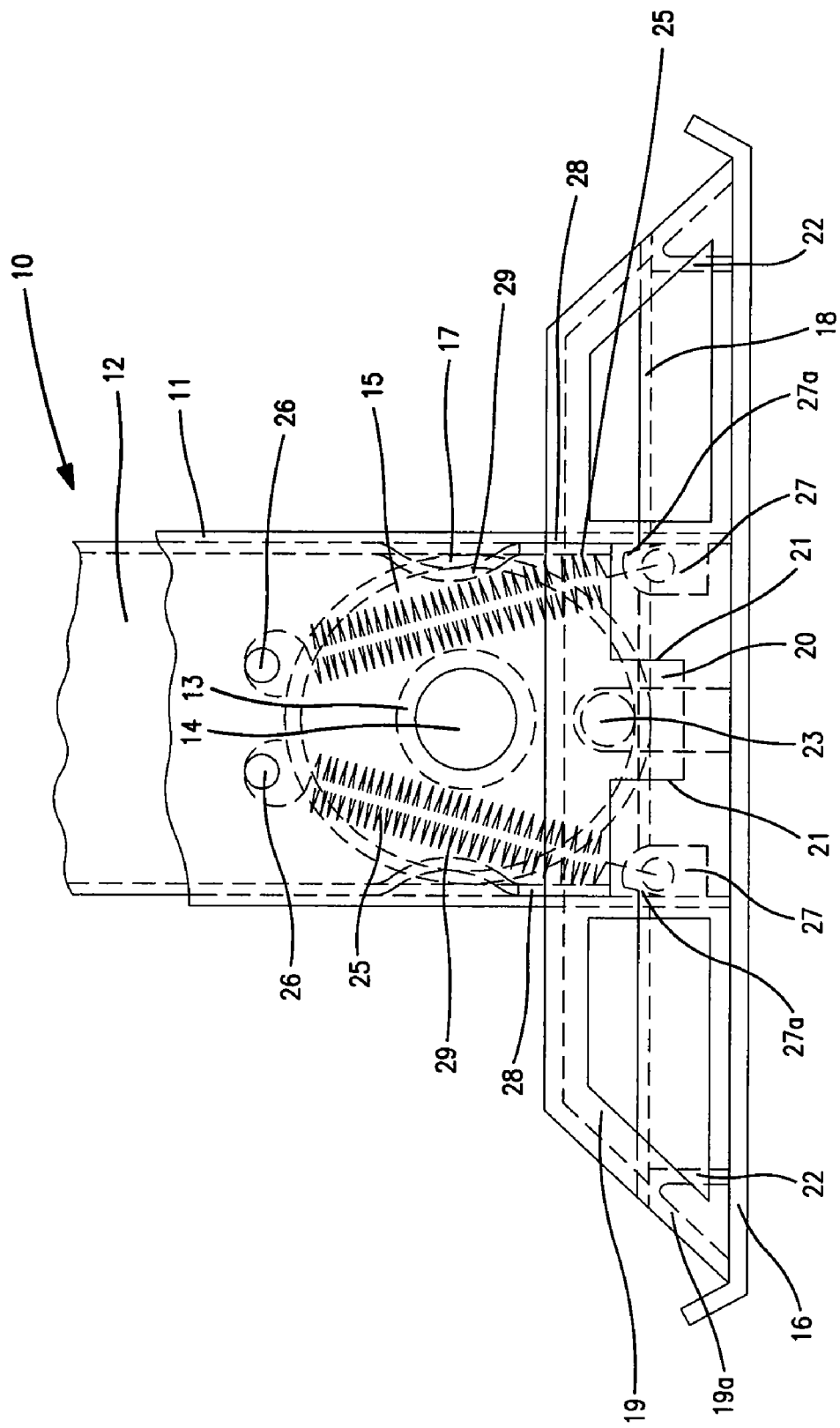
FIG. 1 shows a side view from the lower part of a support with the inner support tube retracted (transporting position)
Figure 2:
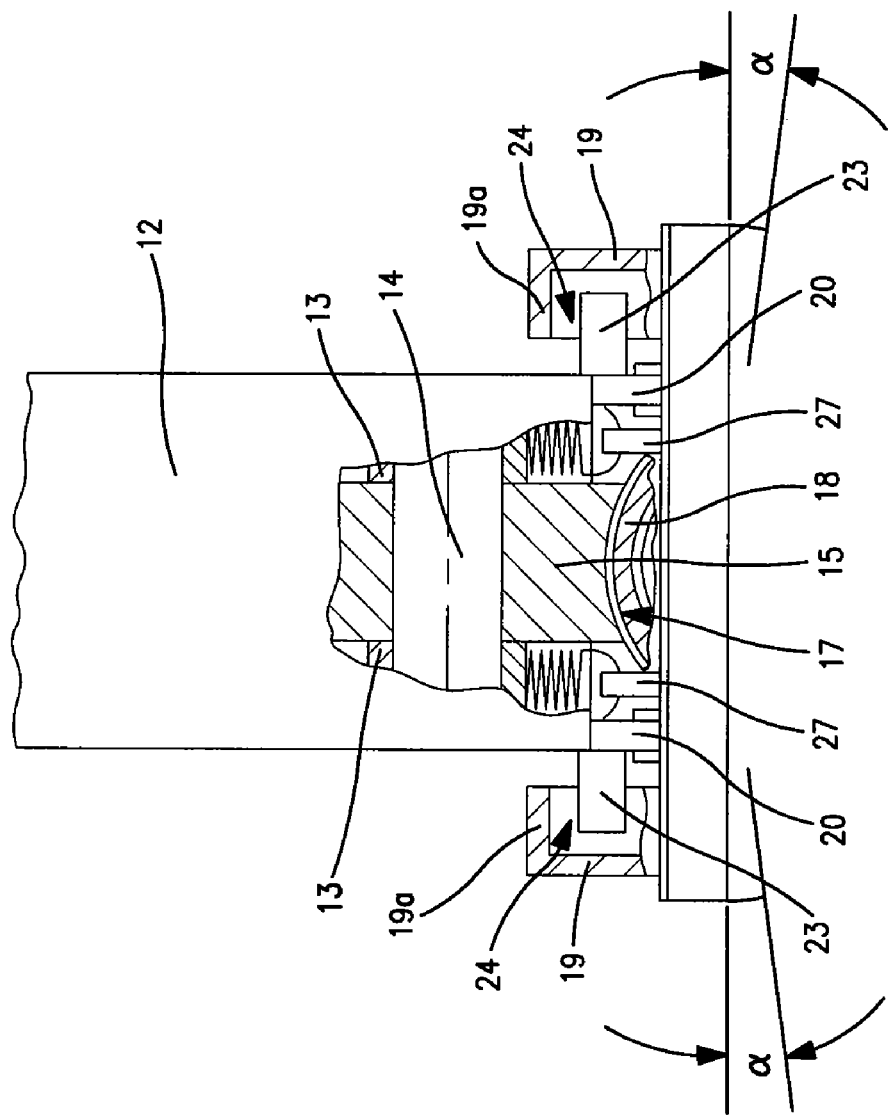
FIG. 2 shows a front view, partially cut away, according to FIG. 1, but in the extended inner support tube (working position)
Figure 3:
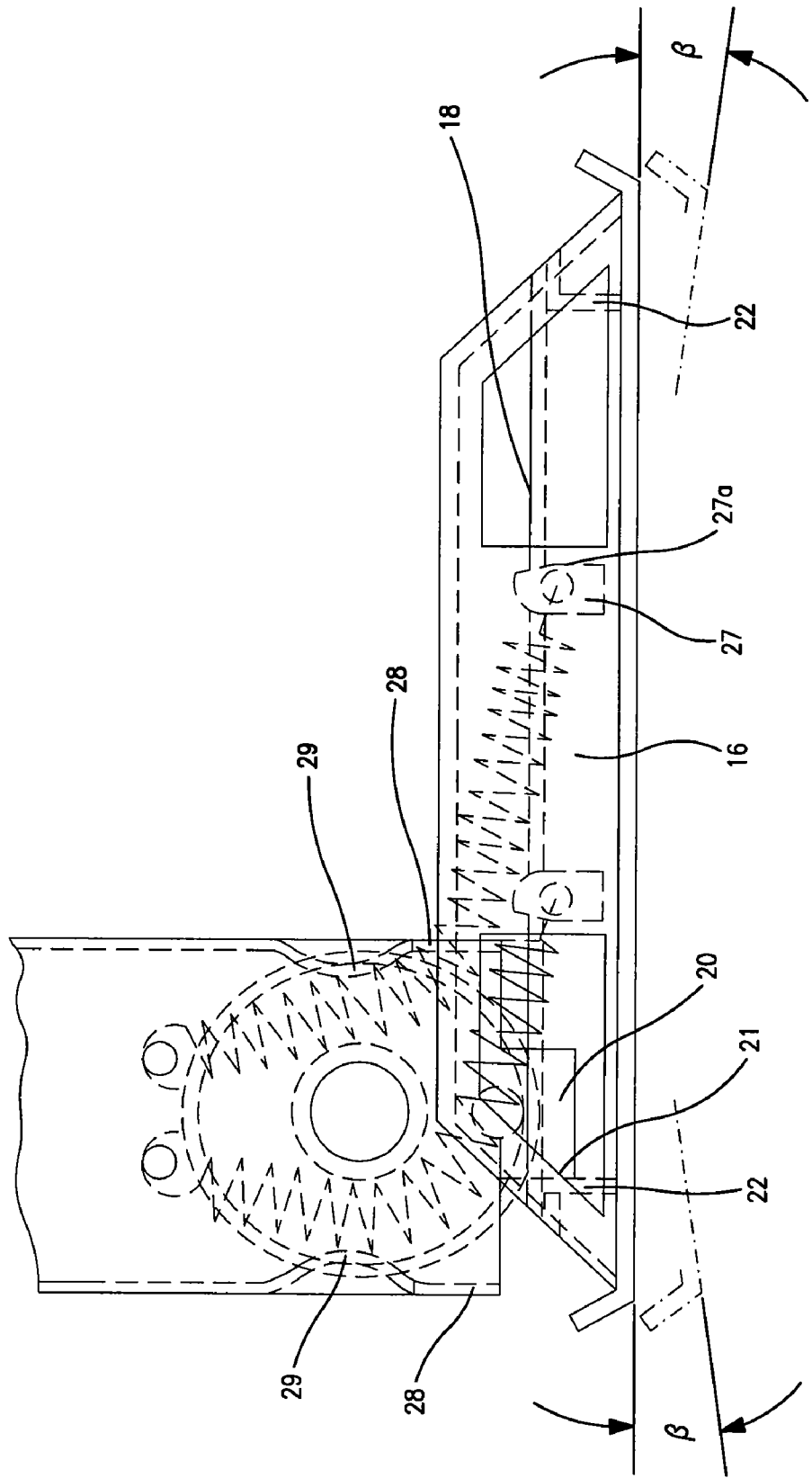
FIG. 3 shows a side view as FIG. 1, with the support being in the maximum compensation position with respect to the center of the foot plate.

Fastened in the lower end region of the inner support tube 12, in the direction looking at FIG. 1, i.e. transversely to the direction of travel of the semitrailer, are two spaced-apart, aligned bearing housings 13 in which a cylindrical axle 14 is fixed. A track roller 15 is mounted rotatably on the axle 14 and, when the inner support tube 12 is extended, transmits the load pressure to a foot plate 16 resting on the ground and can roll along said foot plate. For this purpose, the track roller 15 has a cross-sectionally circular-arc-shaped, concave track groove 17 on the circumference, and the foot plate 16 has a rolling track 18 which is complementary to the track groove 17, is of convex design and at the same time guides the track roller 15. Apart from the raised rolling track 18 running centrally in the longitudinal direction, the upper side of the foot plate 16 has two reinforcing ribs 19 arranged in a mirror-inverted manner next to said rolling track. The reinforcing ribs 19 each comprise a vertical web region and a supporting edge 19a which is arranged thereon and points to the center of the foot plate 16. At its lower end, the inner support tube 12 has a pair of center-symmetrical extensions 20 which each have stop surfaces 21 which are indented in relation to the left and the right outer surfaces of the inner support tube 12 and, upon maximum compensating distance of the support, strike against stoppers 22 sitting on the foot plate 16 and limit the compensating distance. In addition, two retaining pins 23, which are situated opposite each other on the sides on which the extensions 20 are arranged and point outwards and under the particular supporting edge 19a of the reinforcing rib 19, are situated on the inner support tube 12. The supporting edges 19a of the reinforcing ribs 19 and retaining pins 23 form a retaining device 24 (described further on). The retaining pins 23 are generally spaced apart from the reinforcing ribs 19 and the foot plate 16, so that the foot plate 16 is pivotable both about its longitudinal axis, for example at the angle α, and about its transverse axis, for example at the angle β, and can be adapted to the unevennesses of the ground. Tension springs 25 are situated in two parallel planes, in each case between one side of the track roller 15 and the opposite walls of the inner support tube 12. The tension springs 25 are fastened in each case by the upper eyelet to a mount 26 in the inner support tube 12 and by means of their lower eyelet directly below the inner support tube 12 to a retaining/introducing tab 27 which sits on the foot plate 16. When the inner support tube is retracted, the prestressed tension springs 25 first of all press the foot plate 16 in a favorable manner rigidly, i.e. not pivotably, in the transporting position against the lower edge of the outer support tube 12 and then, during the extension and retraction of the inner support tube 12, pivotably against the track roller 15.

If the support 10, with its foot plate 16 standing on the ground, in addition to its supporting function is forced to migrate forwards—to the left in FIG. 1—as the rear part of the semitrailer drops, the track roller 15 rolls along the foot plate 16, in which case the tension springs 25 are tensioned more strongly. In the process, the tension spring 25 are gently deflected. This takes place, on the one hand, via deflecting runners 29, which are arranged over cutouts 28 situated on the lower edge of the inner support tube 12, and, on the other hand, on cylindrical regions of the bearing housings 13. The deflecting runners 29 are impressed into the wall regions of the inner support tube.

During the subsequent coupling-on of the semitrailer, at the beginning of the retraction of the inner support tube 12 and the raising from the ground which takes place in the process, the foot plate 16 is pulled back by the tension springs 25 into its starting position according to FIG. 1. Towards the end of the retraction stroke of the inner support tube 12, the retaining/introducing tabs 27, which are provided with introducing bevels 27a and the outer distance between which is only slightly smaller in the installation planes of the tension springs 25 than the clear width of the outer support tube 11, bring about a symmetrical fine alignment of the foot plate 16 with the outer support tube 11 when the transporting position is reached. If the tension springs 25 break at the same time, the retaining device 24 becomes effective for the sake of safety. The supporting edges 19a of the reinforcing ribs 19 and the retaining pins 23 on the inner support tube 12 then interlock, so that the foot plate 16 is not lost but rather remains hanging on the inner support tube 12.

Figure 4:
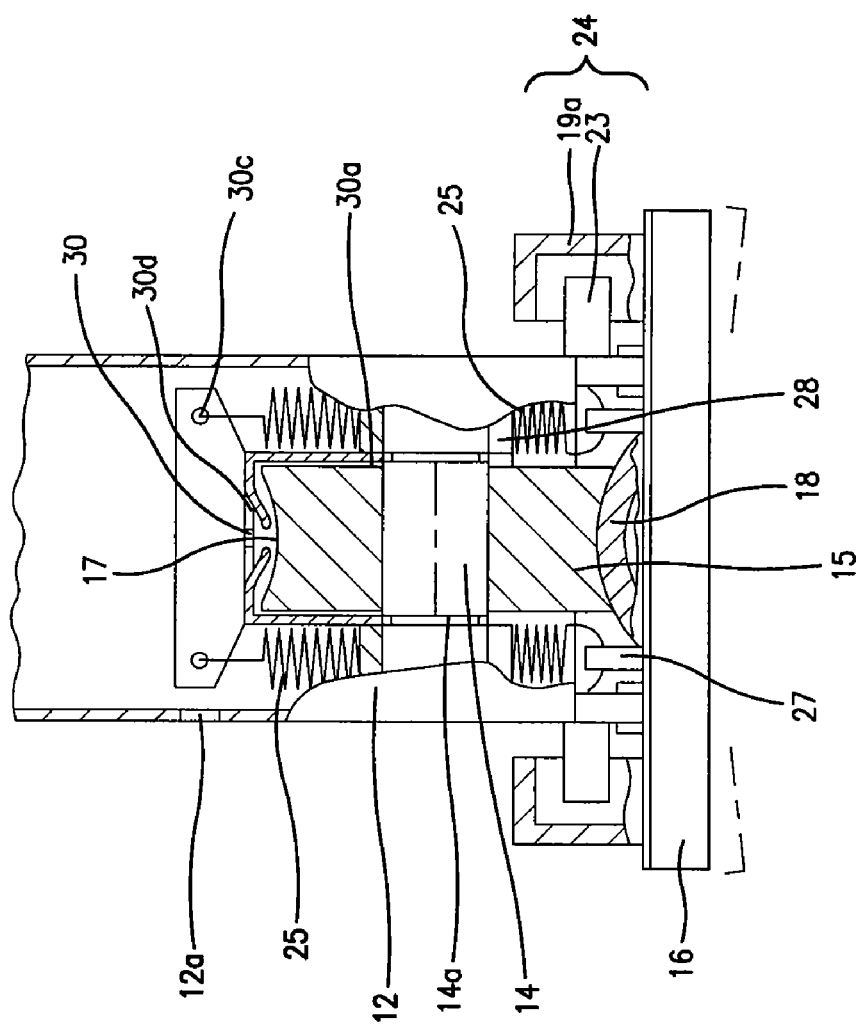
FIG. 4 shows a front view, partially cut away, as FIG. 2, but in a different configuration.
Figure 5:
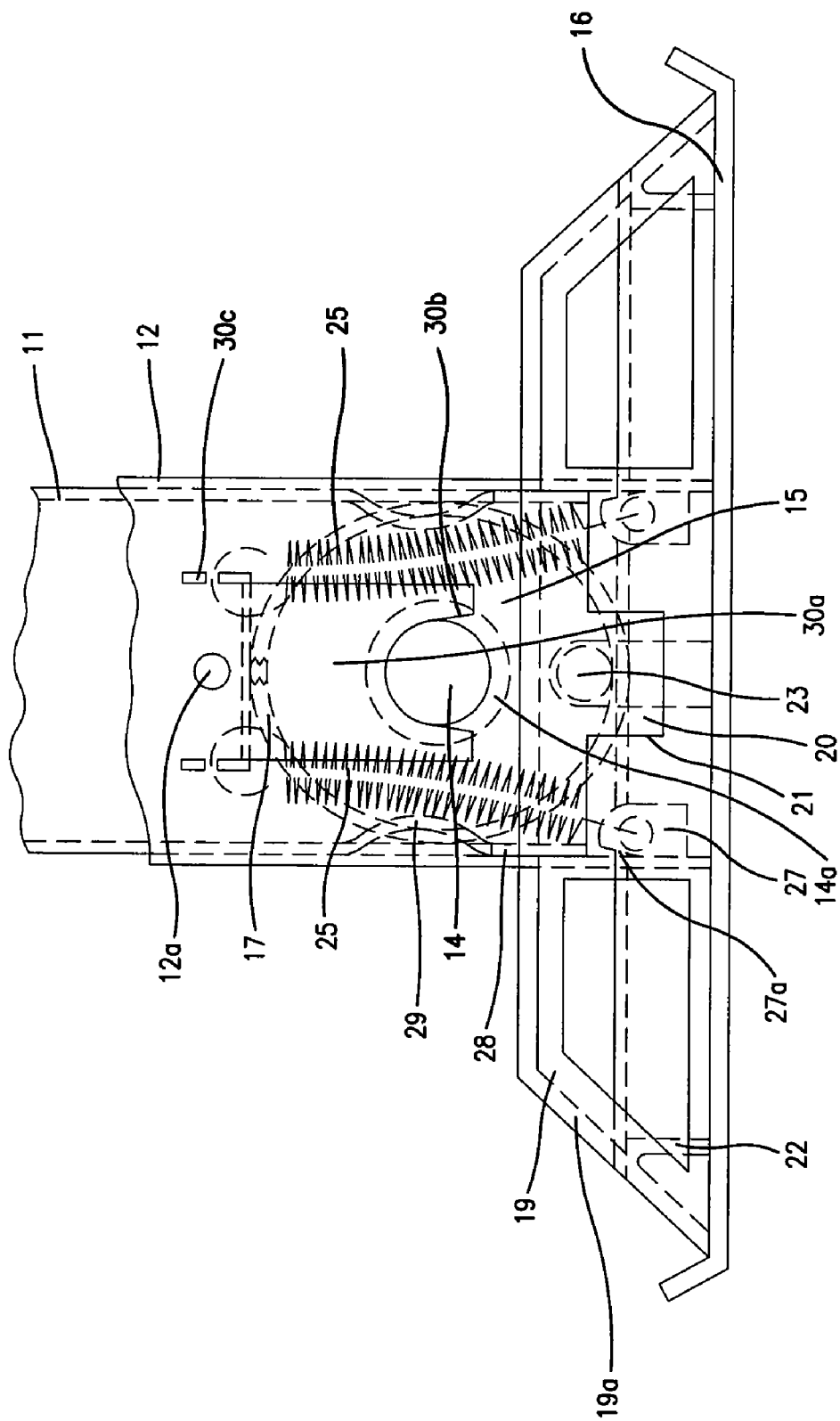
FIG. 5 shows a side view according to FIG. 4.

FIGS. 4 and 5 show a configuration of the support 10 with a fastening/locking attachment 30. The fastening/locking attachment 30 engages partially around the upper region of the track roller 15. It has, in addition to a central region, two vertical, downwardly protruding limbs 30a which have a symmetrical cut-out opening 30b there and sit in a form-fitting manner in grooves 14a of the axle 14. During the preassembly of the subassembly of the foot region of the support 10, the fastening/locking attachment 30 sits with its central region on the track roller 15, in which case the tension springs 25, after being hooked into the retaining/introducing tabs 27 of the foot plate 16, can be hooked in a prestressed manner into receptacles 30c of the fastening/locking attachment 30. The preassembled subassembly of the foot region is supported by the axle 14 which is introduced after the fastening/locking attachment 30 has been raised. In order to raise the fastening/securing attachment 30, an auxiliary opening 12a is provided in the inner support tube 12 and two engagement slots 30d are provided in the fastening/locking attachment 30, into which, for example, a screwdriver for use as a lever can be introduced. The limbs 30a of the fastening/locking attachment 30 latch with edge regions of their cut-out openings 30b into radial grooves 14a of the axle 14, as a result of which there is a form-fitting securing of the axle 14, which prevents it from drifting out of its mounting. The final securing of the axle 14, for the purpose of removal, takes place in turn by levering raising of the fastening/locking attachment 30, as described above, in which case the axle 14 can be pushed out.

The invention claimed is:

1. Height-adjustable support for semitrailers, in which a foot plate, on which a rolling element rolls, is arranged at a lower end of an extendible support part, and, after a compensating stroke and raising of the support have taken place, resetting means pull the foot plate back into a basic position running symmetrically to a longitudinal axis and retain the foot plate in this position against the rolling element, wherein the foot plate is suspended on tension springs which are arranged in two parallel planes situated in each case between a track roller and a wall of an inner support tube, and are fastened to the foot plate by one eyelet in each case in the inner support tube and by their other eyelet directly below the inner support tube, in that there is a stop device for the inner support tube and the foot plate, and in that the support has a retaining device via which the foot plate and the inner support tube can interlock.

2. The support according to claim 1, wherein the stop device comprises a pair of center-symmetrical extensions, which each have stop surfaces indented from the left and the right outer surfaces of the inner support tube, and stoppers which sit on the foot plate and against which the stop surfaces of the inner support tube strike upon maximum compensating distances.

3. The support according to claim 1, wherein the retaining device comprises supporting edges, which are situated on reinforcing ribs of the foot plate, and retaining pins, which sit on the inner support tube.

4. The support according to claim 3, wherein the retaining pins are arranged laterally and in terms of height with respect to the reinforcing ribs and their supporting edges in such a manner that they are generally spaced apart, so that the foot plate is pivotable both about its longitudinal axis and about its transverse axis and only in the event of an emergency interlocks with the retaining pins on the inner support tube and cannot be lost.

5. The support according to claim 1, wherein the track roller installed in the inner support tube has a concave track groove on the circumference, and in that the foot plate has a rolling track which is complementary thereto and is of convex design.

6. The support according to claim 1, wherein deflecting runners for the tension springs are provided in the inner support tube.

7. The support according to claim 6, wherein the deflecting runners are formed by correspondingly impressed wall regions of the inner support tube.

8. The support according to claim 1, wherein a mount for the tension springs has at least one round bar.

9. The support according to claim 1, wherein there are cutouts on the lower edge of the inner support tube.

10. The support according to claim 1, wherein the tension springs are fastened directly to a fastening/locking attachment in the inner support tube.

11. The support according to claim 10, wherein the fastening/locking attachment sits on an axle.

12. The support according to claims 10, wherein the fastening/locking attachment sits on the track roller.

13. The support according to claim 10, wherein the fastening/locking attachment has two vertically downwardly protruding limbs.

14. The support according to claim 13, wherein the fastening/locking attachment has two further limbs, which are offset by 90° with respect to the limbs and protrude laterally, as receptacles for hooking the tension springs in.

15. The support according to claim 1, wherein an axle has at least one radial groove.

16. The support according to claims 13, wherein there are cut-out openings on the limbs of the fastening/locking attachment, the partial edge regions of the openings latch in a form-fitting manner into a radial grooves of an axle.

17. The support according to claim 13, wherein there is at least one auxiliary opening in the inner support tube and there is at least one engagement slot in the fastening/locking attachment.

\* \* \* \* \*